(12) United States Patent
Morinaga et al.

(10) Patent No.: US 11,448,979 B2
(45) Date of Patent: Sep. 20, 2022

(54) DISCHARGE DEVICE, PARTICLE MANUFACTURING APPARATUS, AND PARTICLE

(71) Applicant: Ricoh Company, Ltd., Tokyo (JP)

(72) Inventors: Tadahiko Morinaga, Kanagawa (JP); Tatsuru Moritani, Kanagawa (JP); Naoki Shiraishi, Kanagawa (JP); Shinji Aoki, Kanagawa (JP); Hisayoshi Ohshima, Kanagawa (JP); Yuichi Sato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 118 days.

(21) Appl. No.: 16/361,776

(22) Filed: Mar. 22, 2019

(65) Prior Publication Data

US 2019/0302633 A1 Oct. 3, 2019

(30) Foreign Application Priority Data

Mar. 30, 2018 (JP) .............................. JP2018-069496

(51) Int. Cl.
*B01J 2/18* (2006.01)
*B01J 2/04* (2006.01)
(Continued)

(52) U.S. Cl.
CPC .............. *G03G 9/0804* (2013.01); *B01J 2/04* (2013.01); *B01J 2/18* (2013.01); *B01J 4/001* (2013.01);
(Continued)

(58) Field of Classification Search
CPC .................. B01J 2/02; B01J 2/04; B01J 2/18; B01J 2/20
(Continued)

(56) References Cited

U.S. PATENT DOCUMENTS 3,249,657 A  5/1966 Russo
3,592,391 A * 7/1971 Bender .................... B22F 9/082
                                                     425/7

(Continued)

FOREIGN PATENT DOCUMENTS

CN   101293187 A   10/2008
CN   102958593 A   3/2013

(Continued)

OTHER PUBLICATIONS

Extended European Search Report dated Jun. 26, 2019 in European Patent Application No. 19164590.2, 7 pages.
(Continued)

*Primary Examiner* — Seyed Masoud Malekzadeh
(74) *Attorney, Agent, or Firm* — Xsensus LLP (57) ABSTRACT

A discharge device is provided. The discharge device includes a liquid feed-discharger, and the liquid feed-discharger includes a feed unit configured to feed a liquid and a discharge unit having discharge holes configured to discharge the liquid fed by the feed unit. A ratio (X/Y) of a maximum cross-sectional area X (mm$^2$) to a minimum cross-sectional area Y (mm$^2$) of the liquid feed-discharger in a direction orthogonal to an axial direction of the liquid feed-discharger is from 1 to 5.

12 Claims, 9 Drawing Sheets

(51) Int. Cl.
  *B01J 4/00* (2006.01)
  *G03G 9/08* (2006.01)
(52) U.S. Cl.
  CPC ......... *G03G 9/0819* (2013.01); *G03G 9/0827* (2013.01)
(58) Field of Classification Search
  USPC .............................................. 425/6, 7, 8, 10
  See application file for complete search history.

(56) References Cited

U.S. PATENT DOCUMENTS

| | | | | |
|---|---|---|---|---|
| 5,628,937 | A * | 5/1997 | Oliver | B29B 9/10 425/10 |
| 8,034,526 | B2 * | 10/2011 | Watanabe | G03G 9/087 95 430/108.4 |
| 8,568,628 | B2 * | 10/2013 | Norikane | G03G 9/0804 425/10 |
| 8,603,373 | B2 * | 12/2013 | Ohtani | G03G 9/087 64 264/9 |
| 8,652,744 | B2 * | 2/2014 | Yohichiroh | G03G 9/087 86 430/137.1 |
| 9,023,572 | B2 * | 5/2015 | Honda | C08J 3/122 34/372 |
| 9,573,104 | B2 * | 2/2017 | Rijfers | B01J 2/04 |
| 10,772,836 | B2 * | 9/2020 | Onoue | A61K 9/14 |
| 2007/0204791 | A1 * | 9/2007 | Nakata | C30B 11/003 117/85 |
| 2008/0286679 | A1 | 11/2008 | Norikane et al. | |
| 2008/0286680 | A1 * | 11/2008 | Norikane | G03G 9/0804 430/110.4 |
| 2009/0042118 | A1 | 2/2009 | Suzuki et al. | |
| 2009/0226837 | A1 | 9/2009 | Norikane et al. | |
| 2009/0317735 | A1 | 12/2009 | Ohtani et al. | |
| 2010/0055590 | A1 | 3/2010 | Honda et al. | |
| 2010/0055600 | A1 | 3/2010 | Norikane et al. | |
| 2010/0104970 | A1 | 4/2010 | Norikane et al. | |
| 2010/0284716 | A1 | 11/2010 | Iseki et al. | |
| 2010/0297548 | A1 | 11/2010 | Honda et al. | |
| 2011/0007116 | A1 | 1/2011 | Ohgaki | |
| 2011/0014565 | A1 | 1/2011 | Norikane et al. | |
| 2012/0001355 | A1 | 1/2012 | Donnick | |
| 2012/0094231 | A1 | 4/2012 | Norikane et al. | |
| 2012/0270147 | A1 | 10/2012 | Katoh et al. | |
| 2013/0010035 | A1 | 1/2013 | Norikane et al. | |
| 2013/0003481 | A1 | 2/2013 | Yoshihiro et al. | |
| 2013/0069262 | A1 | 3/2013 | Mulwa et al. | |
| 2013/0157193 | A1 | 6/2013 | Moritani et al. | |
| 2013/0241983 | A1 | 9/2013 | Aoki et al. | |
| 2013/0273188 | A1 * | 10/2013 | Takahashi | B01J 2/18 425/7 |
| 2014/0038100 | A1 | 2/2014 | Kiyotada et al. | |
| 2014/0097267 | A1 | 4/2014 | Shitara et al. | |
| 2014/0141110 | A1 | 5/2014 | Katoh et al. | |
| 2014/0242514 | A1 | 8/2014 | Inoue et al. | |
| 2014/0272695 | A1 * | 9/2014 | Moritani | G03G 9/09392 430/105 |
| 2014/0290205 | A1 * | 10/2014 | Busscher | B29D 99/0078 264/13 |
| 2014/0292947 | A1 | 10/2014 | Norikane et al. | |
| 2014/0346698 | A1 * | 11/2014 | Rijfers | B01J 2/18 264/13 |
| 2015/0047467 | A1 * | 2/2015 | Ruud | C01B 13/20 425/7 |
| 2015/0108671 | A1 | 4/2015 | Norikane et al. | |
| 2015/0362852 | A1 * | 12/2015 | Moriya | G03G 9/08797 430/109.4 |
| 2016/0077455 | A1 * | 3/2016 | Moriya | G03G 9/08711 430/108.4 |
| 2016/0124332 | A1 * | 5/2016 | Takahashi | B01J 2/18 430/108.3 |
| 2016/0147167 | A1 | 5/2016 | Moritani et al. | |
| 2017/0050204 | A1 | 2/2017 | Shitara et al. | |
| 2017/0153574 | A1 | 6/2017 | Kojima et al. | |
| 2017/0343912 | A1 | 11/2017 | Kojima et al. | |
| 2018/0085314 | A1 | 3/2018 | Morinaga et al. | |
| 2018/0373174 | A1 | 12/2018 | Kojima et al. | |
| 2019/0076361 | A1 | 3/2019 | Onoue et al. | |

FOREIGN PATENT DOCUMENTS

| | | |
|---|---|---|
| CN | 105408022 A | 3/2016 |
| JP | 2007-199463 | 8/2007 |
| JP | 2009-20349 | 1/2009 |
| JP | 2016-147225 A | 8/2016 |

OTHER PUBLICATIONS

Combined Chinese Office Action and Search Report dated Dec. 25, 2020 in Chinese Patent Application No. 201910246536.4, 7 pages.

* cited by examiner

DISCHARGE DEVICE, PARTICLE MANUFACTURING APPARATUS, AND PARTICLE

CROSS-REFERENCE TO RELATED APPLICATIONS

This patent application is based on and claims priority pursuant to 35 U.S.C. § 119(a) to Japanese Patent Application No. 2018-069496, filed on Mar. 30, 2018, in the Japan Patent Office, the entire disclosure of which is hereby incorporated by reference herein.

BACKGROUND

Technical Field

The present disclosure relates to a discharge device, a particle manufacturing device, and a particle.

Description of the Related Art

Conventionally, medicinal particles, toner particles for electrophotography, spacer particles for liquid crystal panels, fine colored particles for electronic paper, etc., have been required to have a uniform particle size, in other words, to have a narrow particle size distribution. The particle size distribution is generally represented by the ratio (Dv/Dn) of the volume average particle diameter (Dv) to the number average particle diameter (Dn).

As a method for manufacturing particles having a narrow particle size distribution, a soap-free polymerization method has been proposed in which a resin solution dissolving a resin is dispersed in a medium such as water to induce a polymerization reaction to produce fine particles. However, the soap-free polymerization method has a drawback of poor production efficiency because solvent removal is conducted while the resulting resin particles are kept dispersed in the medium. Also, the soap-free polymerization method not only takes time for the polymerization process, but also consumes a lot of time, materials, and energy for repeating the washing operation after separating the resin particles from the solvent after the polymerization process.

In view of this situation, a particle manufacturing apparatus has been proposed which applies a vibration to a resin solution to discharge the resin solution from discharge holes to form droplets in a gas phase and solidifies the formed.

In recent years, fine particles with high added value even in a small amount, particularly fine particles in pharmaceutical products and cosmetics, have attracted attention. At the research and development stage of these fine particles, the stock solution (may also be referred to as "discharge liquid") of the fine particles is extremely valuable. Therefore, it is required to reduce the waste of the stock solution in the particle manufacturing process.

SUMMARY

In accordance with some embodiments of the present invention, a discharge device is provided. The discharge device includes a liquid feed-discharger, and the liquid feed-discharger includes a feed unit configured to feed a liquid and a discharge unit having discharge holes configured to discharge the liquid fed by the feed unit. A ratio (X/Y) of a maximum cross-sectional area X (mm$^2$) to a minimum cross-sectional area Y (mm$^2$) of the liquid feed-discharger in a direction orthogonal to an axial direction of the liquid feed-discharger is from 1 to 5.

In accordance with some embodiments of the present invention, particle manufacturing apparatus is provided. The particle manufacturing apparatus includes the above-described discharge device and a granulation device configured to solidify the liquid discharged by the discharge device to granulate particles.

In accordance with some embodiments of the present invention, a particle manufactured by the above-described particle manufacturing apparatus is provided.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to an embodiment of the present invention, a discharge device is provided that delivers stable liquid discharge property and particle uniformity, with reducing the amount of a discharge liquid remaining in the device so as not to waste the discharge liquid and with preventing mixing of different liquids.

The inventors of the present invention have studied a discharge device that delivers stable liquid discharge property and particle uniformity, with reducing the amount of a discharge liquid remaining in the device so as not to waste the discharge liquid and with preventing mixing of different liquids, and have made the following findings.

In the conventional techniques described in JP-2009-20349-A and JP-4647506-B (corresponding to JP-2007-199463-A), the stock solution of fine particles is wasted, because the reservoir should be filled up with the stock solution to a region where the stock solution cannot be used as the discharge liquid, at the time of preparation for discharging and liquid filling.

Further, even when the discharge liquid has been discharged until the discharge device becomes empty and incapable of discharging the liquid, the stock solution remains in the reservoir as a trace of the preceded liquid. Therefore, different liquids may mix with each other undesirably.

Discharge Device

The discharge device according to an embodiment of the present invention includes a liquid feed-discharger including a feed unit configured to feed a liquid and a discharge unit having discharge holes configured to discharge the liquid fed by the feed unit, and a ratio (X/Y) of a maximum cross-sectional area X (mm²) to a minimum cross-sectional area Y (mm²) of the liquid feed-discharger in a direction orthogonal to an axial direction of the liquid feed-discharger is from 1 to 5. The discharge device may further include other members as necessary.

In the discharge device according to an embodiment of the present invention, as the ratio (X/Y) of the maximum cross-sectional area X (mm²) to the minimum cross-sectional area Y (mm²) of the liquid feed-discharger in a direction orthogonal to an axial direction of the liquid feed-discharger is from 1 to 5, a structure serving as the reservoir provided in the conventional discharge device is eliminated. By setting the ratio (X/Y) of the maximum cross-sectional area X (mm²) to the minimum cross-sectional area Y (mm²) of the liquid feed-discharger in a direction orthogonal to an axial direction of the liquid feed-discharger to from 1 to 5, it is possible to reduce the amount of the discharge liquid which is likely to remain in a region where the cross-sectional area of the conventional reservoir in a direction orthogonal to an axial direction of the liquid feed-discharger is enlarged and spread. Therefore, in the case of using various different liquids, mixing of the liquids can be prevented.

Liquid Feed-Discharger

The liquid feed-discharger includes: a feed unit configured to feed a liquid; and a discharge unit having discharge holes configured to discharge the liquid fed by the feed unit. The ratio (X/Y) of the maximum cross-sectional area X (mm²) to the minimum cross-sectional area Y (mm²) of the liquid feed-discharger in a direction orthogonal to an axial direction of the liquid feed-discharger is from 1 to 5.

The ratio (X/Y) of the maximum cross-sectional area X (mm²) to the minimum cross-sectional area Y (mm²) of the liquid feed-discharger in a direction orthogonal to an axial direction of the liquid feed-discharger is described below with reference to the drawings.

Figure 1:
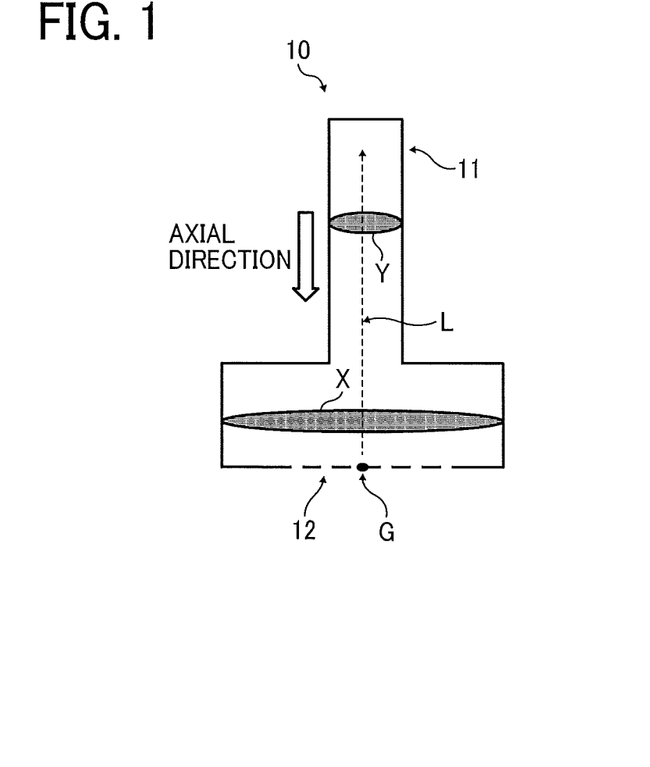
FIG. 1 is a schematic view of a liquid feed-discharger according to an embodiment of the present invention.

FIG. 1 is a diagram illustrating one example of the liquid feed-discharger. The liquid feed-discharger 10 includes a feed unit 11 configured to feed a liquid and a discharge unit 12 having discharge holes configured to discharge the liquid fed by the feed unit 11. For the sake of simplicity, only the feed unit 11 and the discharge unit 12 are illustrated in the liquid feed-discharger 10 in FIG. 1.

Here, the axis of the liquid feed-discharger 10 refers to the long axis of the liquid feed-discharger 10. A cross section of the liquid feed-discharger 10 orthogonal to the axial direction of the liquid feed-discharger 10 refers to a cross section of the liquid feed-discharger 10 orthogonal to the longitudinal direction of the liquid feed-discharger 10. When taking cross-sectional areas of the liquid feed-discharger 10 in a direction orthogonal to the axial direction of the liquid feed-discharger 10, the ratio (X/Y) of the maximum cross-sectional area X (mm²) to the minimum cross-sectional area Y (mm²) is from 1 to 5, preferably from 1 to 3, and more preferably from 1 to 2. When the ratio (X/Y) of the maximum cross-sectional area X (mm²) to the minimum cross-sectional area Y (mm²) is 5 or less, the amount of liquid remaining in the liquid feed-discharger can be reduced.

In one embodiment, the liquid feed-discharger includes a feed channel to feed a liquid and a discharge unit having a plurality of discharge holes configured to discharge the liquid fed by the feed channel. The feed channel may include a first section and a second section, wherein the first section has a maximum cross-sectional area X (mm²) of the feed channel and the second section has a minimum cross-sectional area Y (mm²) of the feed channel. A ratio (X/Y) of the maximum cross-sectional area X (mm²) of the first section to the minimum cross-sectional area Y (mm²) of the second section of the liquid feed-discharger, X and Y being defined as areas of cross-sections of the first section and the second section respectively of the liquid feed-discharger in a direction orthogonal to an axial direction of the liquid feed-discharger, is from 1 to 5, and the first section is closer to the plurality of discharge holes than the second section.

Further, it is preferable that the maximum cross-sectional area X (mm²) and the minimum cross-sectional area Y (mm²) are taken within a section extending from the center of gravity G of the discharge unit for a length (mm) having a value L in the axial direction of the liquid feed-discharger, where the value L is equal to a value T obtained from the following formula (1):

$$S(\mu m^2)/300 = T(\mu m^2) \qquad \text{Formula (1)}$$

In the above formula (1), T ($\mu m^2$) is a value obtained by dividing the total area S ($\mu m^2$) of the discharge holes (may also be referred to as "nozzle holes") provided in the discharge unit by a constant 300. The value obtained by replacing the unit "$\mu m^2$" of the value T with the unit "mm" for length is taken as a reservoir determination distance L (mm). The center of gravity G of the discharge unit and the axis of the liquid feed-discharger are connected by a straight line. When the maximum cross-sectional area X (mm²) and the minimum cross-sectional area Y (mm²) are taken within a section extending from the center of gravity G of the discharge unit for a length (mm) having a value L in the axial direction of the liquid feed-discharger, the amount of liquid remaining in the liquid feed-discharger can be more reduced.

Figure 2:
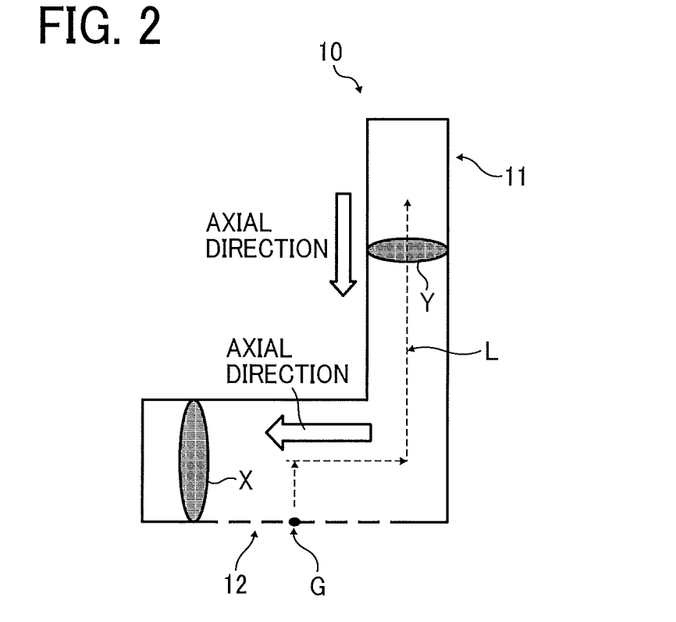
FIG. 2 is a schematic view of a liquid feed-discharger according to an embodiment of the present invention.

FIG. 2 is a diagram illustrating another example of the liquid feed-discharger. In a case in which the center of gravity G of the discharge unit 12 and the axis of the liquid feed-discharger 10 cannot be connected by a straight line, as illustrated in FIG. 2, the reservoir determination distance L is measured along the axis of the liquid feed-discharger 10 from a connected position where the center of gravity G of the discharge unit 12 and the axis of the liquid feed-discharger 10 are connected with the shortest distance.

Further, in a case in which the discharge unit 12 has a three-dimensional structure, the center of gravity G of the smallest rectangular parallelepiped that can accommodate the discharge unit therein is deemed as the center of gravity G of the discharge unit.

Feed Unit

The feed unit is not limited in material, shape, etc., and can be appropriately selected according to the purpose as long as a liquid can be fed thereby.

Examples of the material of the feed unit include, but are not limited to, resins such as TEFLON (registered trademark), silicone, and polyimide, and metals such as stainless steel copper (SUS) and Ni.

Examples of the shape of the feed unit include, but are not limited to, a cylindrical shape and a polygonal shape.

Discharge Unit

The discharge unit is configured to discharge a liquid fed by the feed unit. The liquid discharged by the discharge unit is formed into droplets by a driving force applied upon discharging.

The discharge unit is not limited in material, shape, as well as the number, shape, and position of the discharge holes, as long as a liquid fed by the feed unit can be discharged thereby, and can be appropriately selected according to the purpose.

Examples of the material of the discharge unit include, but are not limited to, resins such as TEFLON (registered trademark), silicone, and polyimide, and metals such as stainless steel copper (SUS) and Ni.

Examples of the shape of the discharge unit include, but are not limited to, a flat plate shape, a cylindrical shape having discharge holes on the peripheral side surface, and a shape curved in a direction of discharge of the liquid (for example, a convex shape). When the shape of the discharge unit is a cylindrical shape or a shape curved in a direction of discharge of the liquid, droplets formed from the discharged liquid are prevented from contacting each other, preventing coalescence of the droplets. Therefore, it is possible to deliver stable liquid discharge property and particles having a uniform shape (i.e., particle uniformity), improving productivity.

The number, shape, and position of the discharge holes provided in the discharge unit are not particularly limited and can be appropriately selected according to the purpose.

The discharge unit may be designed to be detachable from the discharge device according to an embodiment of the present invention so as to improve the internal cleaning property or to be disposable. This makes it easy to prevent mixing of different liquids when the liquids are handled using the same device.

In addition, it is preferable that the surface of the discharge unit has a water repellent treatment. The water repellent treatment is not particularly limited and may be appropriately selected according to the purpose. For example, the water repellent treatment may be a treatment of applying a coating agent. Examples of the coating agent include, but are not limited to, OPTOOL (anti-fingerprint coating, manufactured by DAIKIN INDUSTRIES, LTD.).

Other Members

The other members are not particularly limited and can be appropriately selected according to the purpose. Examples thereof include, but are not limited to, a vibration applicator and a holder.

Vibration Applicator

The vibration applicator is not particularly limited in shape, etc., and can be appropriately selected according to the purpose as long as a vibration can be applied to at least one of the liquid and the feed unit thereby. Examples of the vibration applicator include, but are not limited to, a Rayleigh fission discharger. Examples of the Rayleigh fission discharger include, but are not limited to, a discharger described in JP-4647506-B (corresponding to JP-2007-199463-A). Specific examples of the vibration applicator include, but are not limited to, oscillators in a ring shape, a rectangular parallelepiped shape, or a laminated shape. Specific examples of the oscillators include, but are not limited to, bulk PZT (lead zirconate titanate).

The vibration applicator applies a vibration to at least one of the liquid and the feed unit so as to make the liquid discharged from the discharge unit into droplets. Similar to the discharge unit, the vibration applicator may be designed to be detachable from the discharge device so as to improve the cleaning property or to be disposable. This makes it easy to prevent mixing of different liquids when the liquids are handled using the same device.

Holder

The holder is not limited in shape, material, and size and can be appropriately selected according to the purpose as long as the vibration applicator and the liquid feed-discharger can be fixed or held thereby.

By designing the holder such that the discharge unit of the liquid feed-discharger and the vibration applicator are detachable from the discharge device, the effect of the discharge device, for delivering stable liquid discharge property and particle uniformity with reducing the amount of a discharge liquid remaining in the device so as not to waste the discharge liquid and with preventing mixing of different liquids, is improved.

The discharge device according to an embodiment of the present invention is described in more detail below with reference to the drawings.

Figure 3:
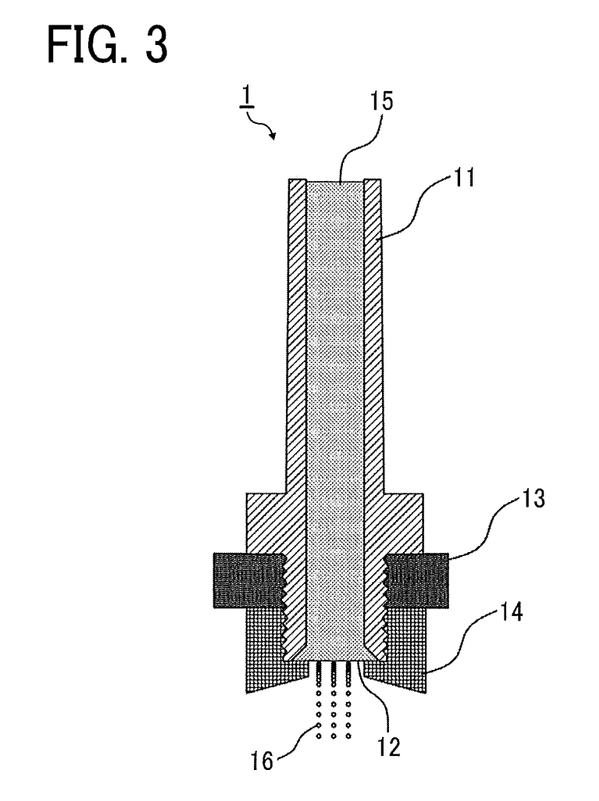
FIG. 3 is a cross-sectional view of a discharge device according to an embodiment of the present invention.

FIG. 3 is a cross-sectional view illustrating a discharge device according to an embodiment of the present invention. A discharge device 1 illustrated in FIG. 3 includes a liquid feed-discharger including a feed unit 11 and a discharge unit 12, a vibration applicator 13 being a ring-shaped oscillator, and a holder 14. Discharge devices according to other embodiments of the present invention illustrated in FIGS. 5 and 9 have the same configuration as the discharge device illustrated in FIG. 3 unless otherwise specified. As the 
vibration applicator in the present embodiment, a discharger described in JP-4647506-B (corresponding to JP-2007-199463-A) is used.

Figure 5:
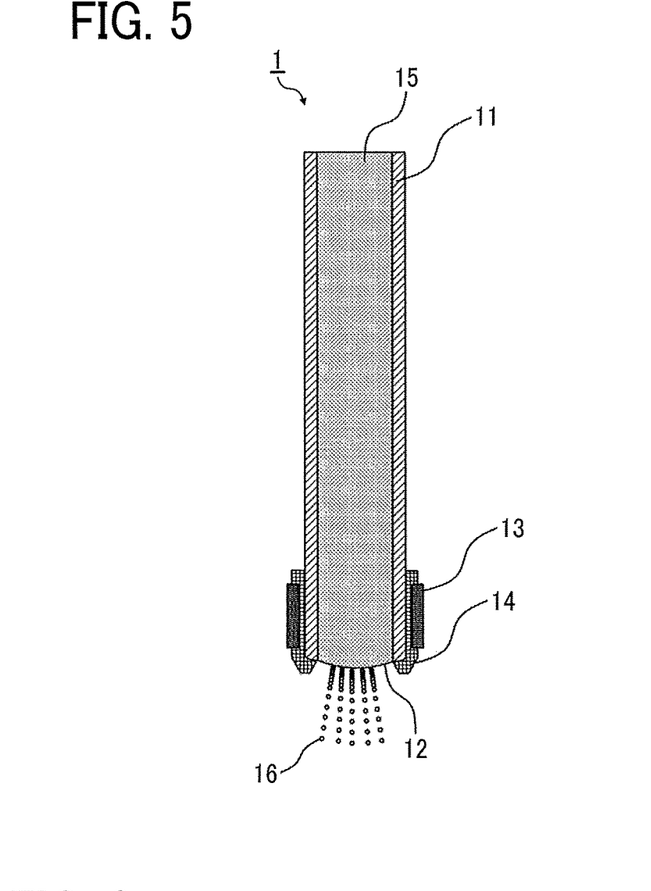
FIG. 5 is a cross-sectional view of a discharge device according to an embodiment of the present invention.
Figure 9:
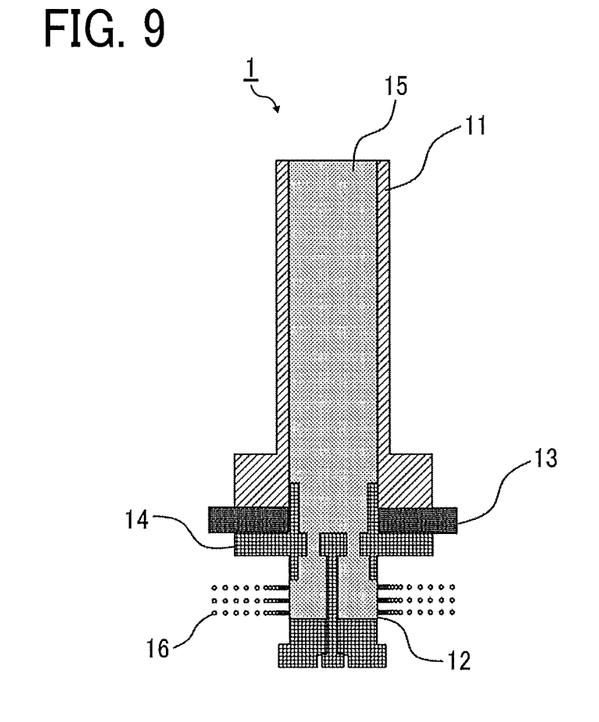
FIG. 9 is a cross-sectional view of a discharge device according to an embodiment of the present invention.

In the discharge devices illustrated in FIGS. 3, 5, and 9, the ratio (X/Y) of the maximum cross-sectional area X (mm$^2$) to the minimum cross-sectional area Y (mm$^2$) of the liquid feed-discharger in a direction orthogonal to the axial direction of the liquid feed-discharger is from 1 to 5. Such a configuration provides a discharge device without a reservoir generally provided in a conventional discharge device.

Figure 4:
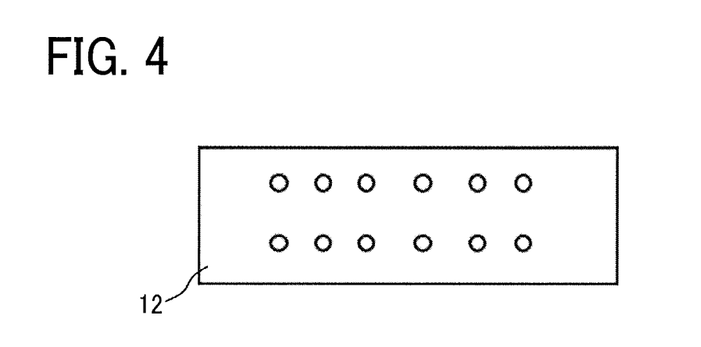
FIG. 4 is a bottom view of a discharge unit according to an embodiment of the present invention, having a flat plate shape.

The discharge device 1 illustrated in FIG. 3 has the discharge unit 12 having a flat plate shape illustrated in FIG. 4.

In the discharge device 1 illustrated in FIG. 3, the ring-shaped oscillator (vibration applicator 13) is held and fixed at a tip of the feed unit 11 by being sandwiched between the feed unit 11 protruding and the holder 14. The holder 14 is designed to detachably engage the discharge unit 12 with the tip of the feed unit 11 to prevent liquid leakage. Liquid leakage may also be prevented by shielding with an ordinary packing. The vibration applicator 13 may also be fixed by bonding or joining without using the holder 14.

FIG. 5 is a cross-sectional view illustrating a discharge device according to another embodiment of the present invention. In the discharge device 1 illustrated in FIG. 5, the discharge unit 12 has a shape curved in the direction of discharge of a liquid 15. In the discharge device 1 illustrated in FIG. 5, a ring-shaped bulk PZT serving as the vibration applicator 13 is adhered to the holder 14. In the discharge device 1 illustrated in FIG. 5 having the discharge unit 12 having a curved shape, the liquid 15 is discharged at various different angles and the discharged droplets 16 are prevented from contacting each other, thereby delivering stable liquid discharge property and particle uniformity.

Figure 6:
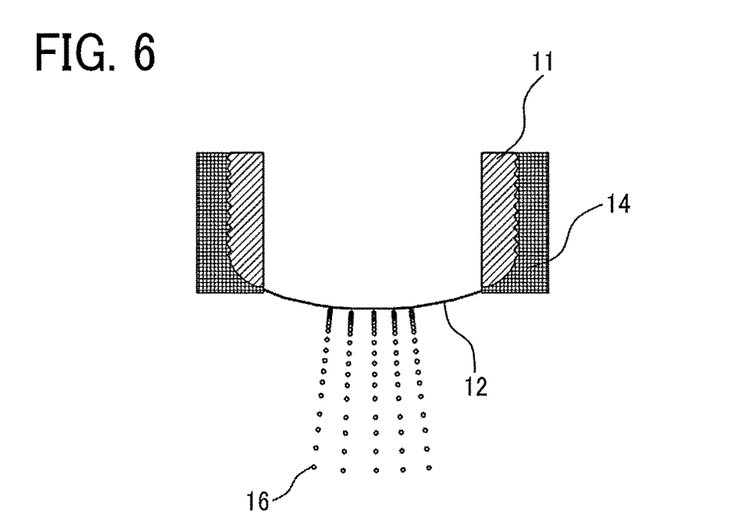
FIG. 6 is a cross-sectional view of a discharge unit according to an embodiment of the present invention, curved in a direction of discharge of liquid.
Figure 7:
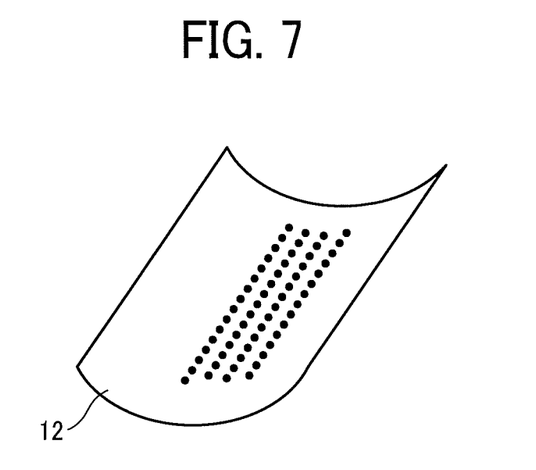
FIG. 7 is a perspective view of the discharge unit illustrated in FIG. 6 according to an embodiment of the present invention.
Figure 8:
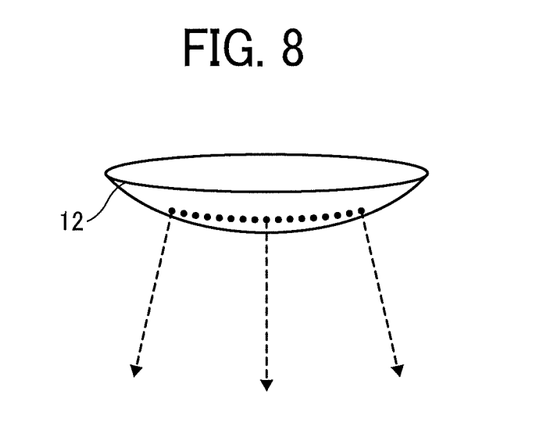
FIG. 8 is a perspective view of the discharge unit illustrated in FIG. 6 according to another embodiment of the present invention.

FIG. 6 is a magnified view of the discharge unit 12 illustrated in FIG. 5. The discharge unit 12 illustrated in FIG. 6 may have either a shape curved in uniaxial direction as illustrated in FIG. 7 or a convex shape curved in biaxial directions as illustrated in FIG. 8. Also in the discharge device 1 illustrated in FIG. 5, the discharge unit 12 is designed to be detachable.

Figure 10:
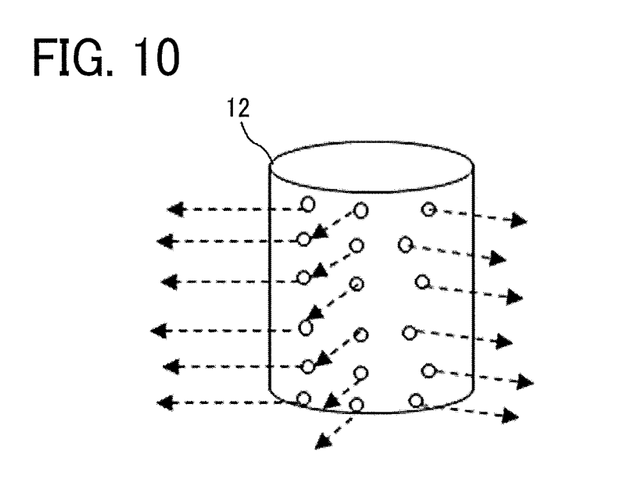
FIG. 10 is a perspective view of a discharge unit according to an embodiment of the present invention.

FIG. 9 is a cross-sectional view illustrating a discharge device according to another embodiment of the present invention. The discharge device 1 illustrated in FIG. 9 have the same configuration as that illustrated in FIG. 3 except that the discharge unit 12 is changed to that having a cylindrical shape illustrated in FIG. 10 that discharges the liquid 15 from discharge holes provided on the peripheral side surface of the cylinder. By forming the discharge unit into a cylindrical shape, the distance between the discharged liquid and the formed droplets is increased, and the droplets formed from the liquid discharged from different holes are prevented from coalescing. Thus, productivity, stable liquid discharge property, particle uniformity can be delivered.

By setting the ratio (X/Y) of the maximum cross-sectional area X (mm$^2$) to the minimum cross-sectional area Y (mm$^2$) of the liquid feed-discharger in a direction orthogonal to an axial direction of the liquid feed-discharger to from 1 to 5, the discharge device according to an embodiment of the present invention is possible to reduce the amount of the discharge liquid which is likely to remain in a region where the cross-sectional area of the conventional reservoir in a direction orthogonal to an axial direction of the liquid feed-discharger is enlarged and spread. Therefore, there is no need to waste the discharge liquid for rinsing the device, and mixing of different liquids can be prevented. In the discharge device according to an embodiment of the present invention, the shape of the discharge unit can be arbitrarily selected, thereby delivering stable liquid discharge property and particle uniformity.

Particle Manufacturing Apparatus

The particle manufacturing apparatus according to an embodiment of the present invention includes the discharge device according to an embodiment of the present invention and a granulation device configured to solidify the liquid discharged by the discharge device to granulate particles. The apparatus may further include other devices as necessary.

Granulation Device

The granulation device is configured to solidify the liquid discharged by the discharge device according to an embodiment of the present invention to granulate particles.

A method of solidifying the liquid is not particularly limited and can be appropriately selected according to the purpose as long as the liquid can be dried and made into a solid state, although it depends on the properties of the liquid. For example, when the liquid is a solution or dispersion in which a solid raw material is dissolved or dispersed in a volatile solvent, the solidification can be carried out by drying the droplets of the discharged liquid in a conveyance airflow, that is, by volatilizing the solvent. In drying the solvent, the drying condition can be adjusted by appropriately selecting the temperature and vapor pressure of the liquid to be discharged, the type of gas used for the conveyance airflow, and the like. Further, even when the particles are not completely dried, if the collected particles maintain a solid state, the collected particles may be additionally dried in a separate process. Also, the solidification can be carried out by utilizing a temperature change, a chemical reaction, or the like, without following the above-described methods.

The granulation device is not particularly limited and can be appropriately selected according to the purpose as long as the liquid can be dried thereby. Examples of the granulation device include, but are not limited to, a conveyance airflow applicator configured to apply a conveyance airflow for drying the solvent in the liquid. The conveyance airflow applicator is not particularly limited and may be appropriately selected according to the purpose. Examples thereof include, but are not limited to, a conveyance airflow generator.

The conveyance airflow is an airflow for collecting particles while drying droplets formed from the discharged liquid. To obtain particles having a uniform particle size distribution, it is necessary to keep the distance between the discharged droplets. However, although having a constant initial velocity, the discharged droplet rapidly stalls due to air resistance. The droplets discharged later catch up with the stalled droplets, become integrated therewith, and finally become one particle (this phenomenon may be referred to as coalescence). Since this phenomenon occurs steadily, the particle size distribution of the collected particles becomes wide. To prevent coalescence, the conveyance airflow conveys the droplets so as not to bring the droplets into contact with each other while solidifying the droplets. It is preferable that the solidified particles are finally conveyed to a solidified particle collection device.

There are no particular limitations on the method for applying the conveyance airflow, and the direction of application of the conveyance airflow, etc., can be appropriately selected according to the purpose. For example, the conveyance airflow may be applied from a direction substantially orthogonal to the direction of discharge of the liquid. By applying the conveyance airflow from a direction substantially orthogonal to the direction of discharge of the liquid, coalescence of the droplets can be prevented.

In the present disclosure, "a direction substantially orthogonal to the direction of discharge of the liquid" refers to a direction having an angle 90 degrees±10 degrees from the direction of discharge of the liquid.

The gas used for the conveyance airflow is not particularly limited and may be appropriately selected according to the purpose. Examples thereof include, but are not limited to, an incombustible gas such as nitrogen.

Other Devices

The other devices are not particularly limited and can be appropriately selected according to the purpose. Examples thereof include, but are not limited to, a particle collection device.

Particle Collection Device

The particle collection device is not particularly limited and can be appropriately selected according to the purpose. Examples thereof include, but are not limited to, a cyclone and a back filter. In the case of a small amount of powder, a collector such as a cascade impactor is also usable.

The particle manufacturing apparatus according to an embodiment of the present invention is described in detail below with reference to the drawings. Incidentally, the particle manufacturing apparatus according to an embodiment of the present invention is not limited to these embodiments.

Figure 11:
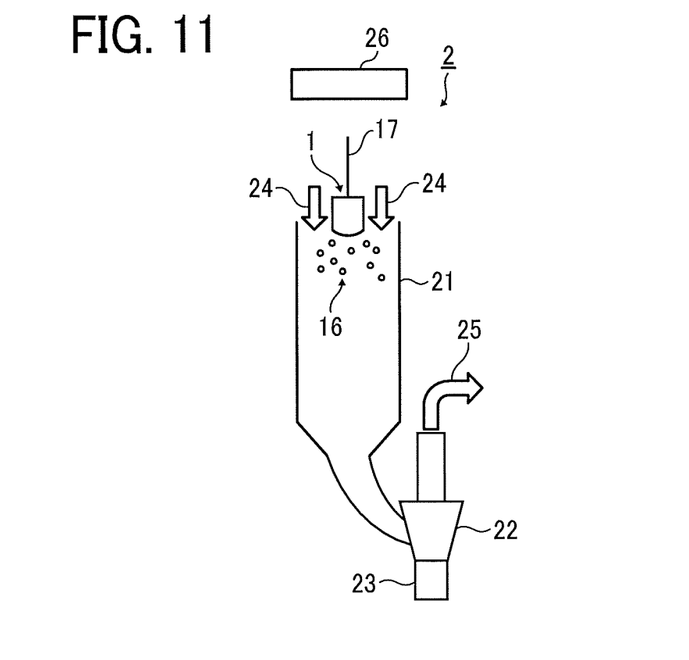
FIG. 11 is a schematic view of a particle manufacturing apparatus according to an embodiment of the present invention.

FIG. 11 is a diagram illustrating one example of the particle manufacturing apparatus. A particle manufacturing apparatus 2 has the discharge device 1 according to an embodiment of the present invention, a drying tower 21 serving as the granulation device, a particle collection device 22, and a conveyance airflow applicator 26. In the particle manufacturing apparatus 2, the discharge device 1 discharges a liquid supplied from a liquid supply pipe 17 to the drying tower 21 to form droplets. The discharged droplets 16 are dried by a conveyance airflow 24 and a suction airflow 25, while being prevented from coalescing with each other, to remain as solid components in the drying tower 21 and become particles. The particles are conveyed to the particle collection device 22 and then collected in a particle storage 23. The particle collection device 22 illustrated in FIG. 11 collects particles using a cyclone mechanism. The collected particles are collected in a powder storage below the cyclone, and an airflow containing the solvent is conveyed to a refrigerator or the like. The direction of discharge of the droplets and the direction of the conveyance airflow can be appropriately adjusted within a range that they do not reach the drying tower.

Figure 12:
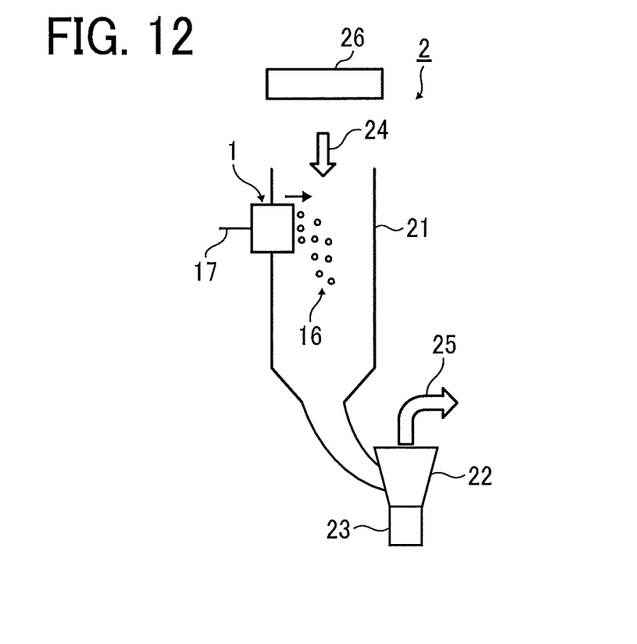
FIG. 12 is a schematic view of a particle manufacturing apparatus according to an embodiment of the present invention.

FIG. 12 is a diagram illustrating another example of the particle manufacturing apparatus. The particle manufacturing apparatus 2 illustrated in FIG. 12 has the same configuration as that illustrated in FIG. 11 except that the discharge device 1 is installed in the drying tower 21. In this embodiment, the conveyance airflow is applied in a direction substantially orthogonal to the direction of discharge of the droplets. Therefore, coalescence of the droplets can be efficiently prevented.

Figure 13:
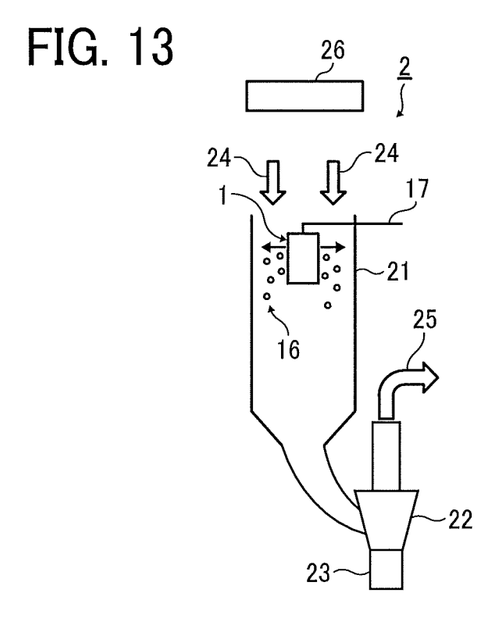
FIG. 13 is a schematic view of a particle manufacturing apparatus according to an embodiment of the present invention.

FIG. 13 is a diagram illustrating another example of the particle manufacturing apparatus. The particle manufacturing apparatus 2 illustrated in FIG. 13 has the same configuration as that illustrated in FIG. 11 except that the discharge unit of the discharge device 1 is changed to that having a cylindrical shape. In this embodiment as well, coalescence of the discharged droplets can be efficiently prevented.

When the amount of residual solvent remaining in the collected particles is large, secondary drying is optionally performed to reduce the residual solvent. The secondary drying can be performed with a commonly known dryers such as a fluidized bed dryer and a vacuum dryer. In the case of producing drug particles, if an organic solvent remains in the drug, the crystal form of the drug may change over time, the medicinal effect may change, and the required effect may not be exerted. In addition, drug particles using a highly toxic solvent are not recognized as a medicine unless the residual solvent is below a certain concentration. Since it is highly possible that the residual solvent exerts an adverse effect, sufficient drying is preferably performed.

Figure 14:
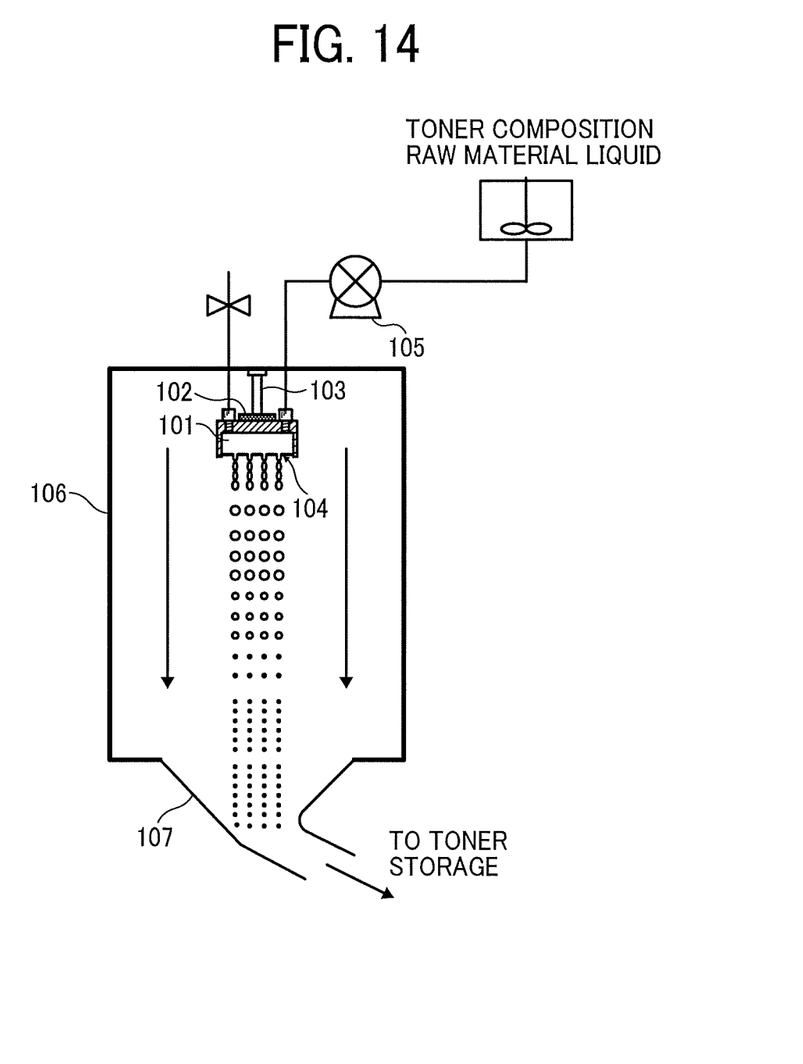
FIG. 14 is a schematic view of a particle manufacturing apparatus according to an embodiment of the present invention.
Figure 15:
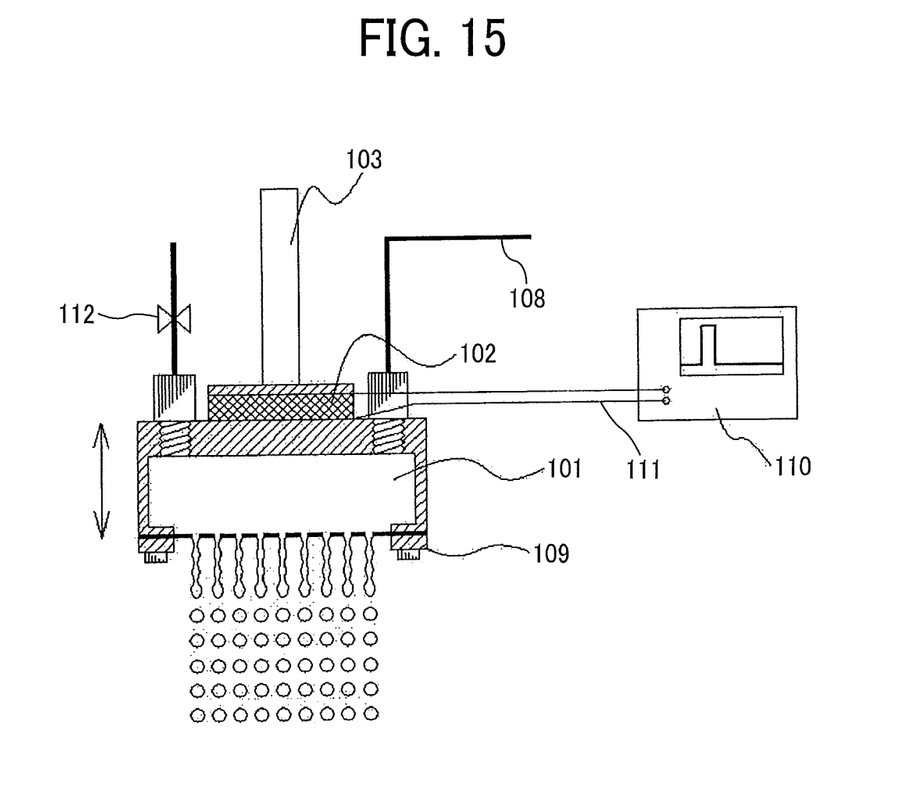
FIG. 15 is a partial magnified view of FIG. 14.

FIGS. 14 and 15 are diagrams illustrating another example of the particle manufacturing apparatus, that is a toner manufacturing apparatus disclosed in JP-4647506-B (corresponding to JP-2007-199463-A).

The toner manufacturing apparatus includes a droplet forming device including a reservoir that stores at least a toner composition raw material liquid, a vibrator, a support that holds the vibrator, and a plurality of through holes. The toner composition raw material liquid is quantitatively supplied to the reservoir and quantitatively discharged from the through holes.

In the droplet forming device, the plurality of the through holes are provided for each of one vibrator, and the vibrator is in contact with a part of the reservoir so as to excite the toner composition raw material liquid through the reservoir. The toner manufacturing apparatus further includes a toner particle forming device that forms toner particles by drying the droplets by removing the solvent contained in the droplets.

More specifically, as illustrated in FIG. 14, the toner manufacturing apparatus includes: the droplet forming device including a reservoir 101 that stores at least the toner composition raw material liquid, a vibrator 102, a support 103 that holds the vibrator 102, and a plurality of through holes 104; a liquid supply device 105 that quantitatively supplies the toner composition raw material liquid to the reservoir 101 to quantitatively discharge the toner composition raw material liquid from the through holes 104; and the toner particle forming device including a solvent removing equipment 106 and a toner collector 107.

The reservoir 101 needs to hold the toner composition raw material liquid in a pressurized state. Therefore, the reservoir 101 is preferably made of a metal such as SUS or aluminum and has a pressure resistance of about 10 MPa. As illustrated in FIG. 15, the reservoir 101 is provided with a mechanism 109 that is connected to a pipe 108 for supplying liquid to the reservoir 101 and is holding a plate having the through holes 104. The vibrator 102 that vibrates the entire reservoir 101 is in contact with the reservoir 101. The vibrator 102 is connected to a vibration generator 110 via a conductive wire 111 and controlled thereby. An open valve 112 that adjusts the pressure in the reservoir and removes bubbles is further provided for stable formation of liquid columns.

Particle

The particle according to an embodiment of the present invention is manufactured by the particle manufacturing apparatus according to an embodiment of the present invention.

Use Application

The particle according to an embodiment of the present invention has excellent safety and stability and is widely applicable to various fields such as daily necessities, medicines, cosmetics, and electrophotographic toners.

The particle according to an embodiment of the present invention may be used as, for example: additives for skin care products such as facial cleanser, sunscreen agent, cleansing agent, lotion, milky lotion, essence, cream, cold cream, after shaving lotion, shaving soap, oil blotting paper, and matting agent; cosmetics such as foundation, powder, water powder, mascara, face powder, essentials, eye brow, eye line, eye shadow, eye shadow base, nose shadow, lipstick, lip gloss, blusher, iron, manicure, and top coat, and modifying agents thereof: additives for hair care products such as shampoo, dry shampoo, conditioner, rinse, rinse in shampoo, treatment, hair tonic, hair conditioner, hair oil, pomade, and hair coloring agent; additives for amenity products such as perfume, eau de cologne, deodorant, baby powder, toothpaste, mouth wash, lip cream, and soap; additives for toner; rheology modifiers for paints; medical diagnostic test agents; agents for improving mechanical properties of molded articles such as automotive materials and building materials; agents for improving mechanical properties of films and fibers; raw materials for resin moldings such as rapid prototyping and rapid manufacturing; various modifiers such as materials for flash molding, paste resins for plastic sol, powder blocking materials, powder fluidity improver, lubricant, rubber compounding agent, abrasive, thickener, filter agent and filter aid, gelling agent, flocculant, additive for paint, oil absorbing agent, release agent, filler for adhesive agent, lubricity improver for plastic films and sheets, anti-blocking agent, gloss regulator, matte finish, light diffuser, surface hardness improver, and toughness improver; as well as spacers for liquid crystal display devices, fillers for chromatography, substrates and additives for cosmetic foundation, auxiliaries for microcapsules, medicinal materials for drug delivery systems and diagnostic agents, retainers for perfumes and agricultural chemicals, catalysts for chemical reactions and supports thereof, gas adsorbents, sintered materials for ceramic processing, standard particles for measurement and analysis, particles for the food industry field, powder coating materials, and toner for electrophotography.

EXAMPLES

Hereinafter, the present invention will be described more specifically based on examples, but the present invention is not limited by the following examples.

Example 1

First, 1 g of PLGA 7501 (manufactured by Wako Pure Chemical Industries, Ltd.) and 49 g of acetone (manufactured by Wako Pure Chemical Industries, Ltd.) were mixed and stirred by a stirrer (device name: Magnetic Stirrer, available from AS ONE Corporation) at 1,000 rpm for 24 hours to obtain a solution A of PLGA 7501. The solution A was discharged by a discharge device A under the discharge conditions described below, using the particle manufacturing apparatus 2 illustrated in FIG. 11, and dried and solidified to obtain PLGA particles.
Discharge Conditions
  Discharge device: Discharge device A with discharge holes having an inner diameter of 5 μm
  Number of discharge holes: 680
  Reservoir determination distance L (mm): 44 mm
  Maximum cross-sectional area X (mm$^2$): 38 mm$^2$
  Minimum cross-sectional area Y (mm$^2$): 38 mm$^2$
  The ratio of the maximum cross-sectional area X to the minimum cross-sectional area Y within the reservoir determination distance L: X/Y=1.0
  Presence or absence of reservoir (liquid chamber): Absent
  Shape of discharge unit: Convex shape
  Liquid pushing pressure: 0.2 MPa
  Excitation frequency: 300 kHz
  Conveyance airflow direction: Forward direction of the direction of discharge of the solution A by the liquid feed-discharger
  Conveyance airflow temperature: 40 degrees C.

Example 2

The procedure in Example 1 was repeated except that the particle manufacturing apparatus 2 was changed to that illustrated in FIG. 13, the shape of the discharge unit was changed to a cylindrical shape, the discharge device was changed to a discharge device B having a ratio X/Y=1.5, and the conveyance airflow was applied in a direction orthogonal to the direction of discharge of the liquid. Thus, PLGA particles were obtained.
Changed Conditions
  Discharge device: Discharge device B
  Reservoir determination distance L (mm): 44 mm
  Maximum cross-sectional area X (mm$^2$): 60 mm$^2$
  Minimum cross-sectional area Y (mm$^2$): 38 mm$^2$
  The ratio of the maximum cross-sectional area X to the minimum cross-sectional area Y within the reservoir determination distance L: X/Y=1.5
  Presence or absence of reservoir (liquid chamber): Absent
  Shape of discharge unit: Cylindrical shape
  Conveyance airflow direction: Orthogonal to the direction of discharge of the liquid Example 3

The procedure in Example 1 was repeated except that the particle manufacturing apparatus 2 was changed to that illustrated in FIG. 12, the shape of the discharge unit was changed to a flat plate shape, and the discharge device was changed to a discharge device C having a ratio X/Y=3.0. Thus, PLGA particles were obtained.
Changed Conditions
  Discharge device: Discharge device C
  Reservoir determination distance L (mm): 44 mm
  Maximum cross-sectional area X (mm$^2$): 115 mm$^2$
  Minimum cross-sectional area Y (mm$^2$): 38 mm$^2$
  The ratio of the maximum cross-sectional area X to the minimum cross-sectional area Y within the reservoir determination distance L: X/Y=3.0
  Presence or absence of reservoir (liquid chamber): Absent
  Shape of discharge unit: Flat plate shape
  Conveyance airflow direction: Orthogonal to the direction of discharge of the liquid Example 4

The procedure in Example 3 was repeated except that the discharge device was changed to a discharge device D having a ratio X/Y=4.0. Thus, PLGA particles were obtained.
Changed Conditions
  Discharge device: Discharge device D
  Reservoir determination distance L (mm): 44 mm
  Maximum cross-sectional area X (mm$^2$): 112 mm$^2$
  Minimum cross-sectional area Y (mm$^2$): 28 mm$^2$ The ratio of the maximum cross-sectional area X to the minimum cross-sectional area Y within the reservoir determination distance L: X/Y=4.0

Presence or absence of reservoir (liquid chamber): Absent

Example 5

The procedure in Example 4 was repeated except that the particle manufacturing apparatus 2 was changed to that illustrated in FIG. 11, the shape of the discharge unit was changed to a flat plate shape, and the conveyance airflow was applied in the same direction as the direction of discharge of the liquid. Thus, PLGA particles were obtained.
Changed Conditions
Conveyance airflow direction: Same as the direction of discharge of the liquid Comparative Example 1

The procedure in Example 5 was repeated except that the discharge device was changed to a discharge device E having a ratio X/Y=6.0 and the conveyance airflow was applied in the same direction as the direction of discharge of the liquid. Thus, PLGA particles were obtained.
Changed Conditions
Discharge device: Discharge device E
Reservoir determination distance L (mm): 44 mm
Maximum cross-sectional area X ($mm^2$): 78 $mm^2$
Minimum cross-sectional area Y ($mm^2$): 13 $mm^2$
The ratio of the maximum cross-sectional area X to the minimum cross-sectional area Y within the reservoir determination distance L: X/Y=6.0
Conveyance airflow direction: Same as the direction of discharge of the liquid Comparative Example 2

The procedure in Example 5 was repeated except that the discharge device was changed to a discharge device F having a ratio X/Y=9.0 and the conveyance airflow was applied in the same direction as the direction of discharge of the liquid. Thus, PLGA particles were obtained.
Changed Conditions
Discharge device: Discharge device F
Reservoir determination distance L (mm): 44 mm
Maximum cross-sectional area X ($mm^2$): 117 $mm^2$
Minimum cross-sectional area Y ($mm^2$): 13 $mm^2$
The ratio of the maximum cross-sectional area X to the minimum cross-sectional area Y within the reservoir determination distance L: X/Y=9.0
Conveyance airflow direction: Same as the direction of discharge of the liquid Next, the "residual liquid in discharge device" and "particle size distribution (Dv/Dn)" were evaluated for the discharge device and the obtained particles, respectively, with respect to Examples 1 to 5 and Comparative Examples 1 and 2 in the following manner. The results are shown in Table 1.
Residual Liquid in Discharge Device
The amount of residual liquid remaining in the discharge device was quantified based on the following formula (i) and evaluated based on the following evaluation criteria.

(Weight (g) of discharge device after discharging)−(Weight (g) of discharge device before discharging)=Amount (g) of Residual Liquid    Formula (i)

Evaluation Criteria
A: Amount (g) of residual liquid is less than 0.30 (g)
B: Amount (g) of residual liquid is 0.30 (g) or more and less than 1.00 (g)
C: Amount (g) of residual liquid is 1.00 (g) or more
Particle Size Distribution (Dv/Dn)
The particle size distribution (volume average particle diameter Dv/number average particle diameter Dn) was measured using a laser diffraction/scattering particle size analyzer (device name: MICROTRAC MT 3000 II, manufactured by MicrotracBEL Corp.) and evaluated based on the following evaluation criteria.
Evaluation Criteria
A: 1.00 or more and less than 1.20
B: 1.20 or more and 1.50 or less
C: more than 1.50
Overall Evaluation
Among the above evaluation results, the lowest judgment result was taken as a comprehensive evaluation result. The results are shown in Table 2.

TABLE 1

| | Discharge Conditions | | | | | | Evaluation Results | | | | |
|---|---|---|---|---|---|---|---|---|---|---|---|
| | | | | | | | Residual Liquid in Discharge Device | | Particle Size Distribution (Dv/Dn) | | |
| | Discharge Device | Particle Manufacturing Apparatus | X/Y | Presence or Absence of Reservoir | Shape of Discharge Unit | Conveyance Airflow Direction | Measurement Results (g) | Judgment | Measurement Results | Judgment | Overall Evaluation |
| Ex. 1 | A | FIG. 11 | 1 | Absent | Convex shape | Forward direction | 0.09 | A | 1.04 | A | A |
| Ex. 2 | B | FIG. 13 | 1.5 | Absent | Cylindrical shape | Orthogonal | 0.17 | A | 1.05 | A | A |
| Ex. 3 | C | FIG. 12 | 3 | Absent | Flat plate shape | Orthogonal | 0.43 | B | 1.14 | A | B |
| Ex. 4 | D | FIG. 12 | 4 | Absent | Flat plate shape | Orthogonal | 0.56 | B | 1.15 | A | B |
| Ex. 5 | D | FIG. 11 | 4 | Absent | Flat plate shape | Liquid discharge direction | 0.55 | B | 1.22 | B | B |
| Comp. Ex. 1 | E | FIG. 11 | 6 | Present | Flat plate shape | Liquid discharge direction | 1.49 | C | 1.21 | B | C |

TABLE 1-continued

| | Discharge Conditions | | | | | Evaluation Results | | | | |
| | | | | | | Residual Liquid in Discharge Device | | Particle Size Distribution | | |
| | | Particle | | | | | | (Dv/Dn) | | |
| | Discharge Device | Manufacturing Apparatus | X/Y | Presence or Absence of Reservoir | Shape of Discharge Unit | Conveyance Airflow Direction | Measurement Results (g) | Judgment | Measurement Results | Judgment | Overall Evaluation |
|---|---|---|---|---|---|---|---|---|---|---|---|
| Comp. Ex. 2 | F | FIG. 11 | 9 | Present | Flat plate shape | Liquid discharge direction | 3.56 | C | 1.25 | B | C |

As indicated by Examples 1 to 5, the discharge device in which the ratio (X/Y) of the maximum cross-sectional area X to the minimum cross-sectional area Y of the liquid feed-discharger in a direction orthogonal to an axial direction of the liquid feed-discharger was from 1 to 5 was able to reduce the amount of residual liquid in the discharge device. In addition, it is clear that coalescence of the particles is prevented to improve the particle size distribution when the discharge unit has a convex shape or a cylindrical shape and/or the conveyance airflow is applied in a direction substantially orthogonal to the direction of discharge of the liquid.

By contrast, as indicated by Comparative Examples 1 and 2, in the discharge device in which the ratio (X/Y) of the maximum cross-sectional area X to the minimum cross-sectional area Y of the liquid feed-discharger in a direction orthogonal to an axial direction of the liquid feed-discharger was greater than 5, the amount of residual liquid was large. Therefore, in a case in which different types of liquid are sequentially handled using the discharge device of Comparative Example 1 or 2, the liquid may be wastefully consumed because a large amount of the liquid is used for rinsing the discharge device to prevent contamination with the residual liquid.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A discharge device, comprising:
a liquid feed-discharger including:
a feed channel to feed a liquid, the feed channel comprising a first section and a second section, wherein the first section has a maximum cross-sectional area X (mm$^2$) of the feed channel and the second section has a minimum cross-sectional area Y (mm$^2$) of the feed channel; and
a discharge unit having a plurality of discharge holes configured to discharge the liquid fed by the feed channel,
wherein a ratio (X/Y) of the maximum cross-sectional area X (mm$^2$) of the first section to the minimum cross-sectional area Y (mm$^2$) of the second section of the liquid feed-discharger, X and Y being defined as areas of cross-sections of the first section and the second section respectively of the liquid feed-discharger in a direction orthogonal to an axial direction of the liquid feed-discharger, is from 1 to 5 and
the plurality of discharge holes are closer to the first section than the second section, wherein the maximum cross-sectional area X (mm2) and the minimum cross-sectional area Y (mm2) are taken within a section extending from a center of gravity of the discharge unit for a length (mm) having a value L in the axial direction of the liquid feed-discharger, the value L being equal to S (μm2)/300 where S represents a total area of the discharge holes.

2. The discharge device according to claim 1, further comprising:
a vibrator configured to apply a vibration to at least one of the liquid and the feed channel.

3. The discharge device according to claim 2, further comprising:
a holder configured to hold the liquid feed-discharger and the vibrator.

4. The discharge device according to claim 1, wherein the discharge unit has a convex shape curved in a direction of discharge of the liquid.

5. The discharge device according to claim 1, wherein the discharge unit has a cylindrical shape.

6. A particle manufacturing apparatus comprising:
the discharge device according to claim 1; and
a granulation device configured to solidify the liquid discharged by the discharge device to granulate particles.

7. The particle manufacturing apparatus according to claim 6, further comprising:
a particle collection device configured to collect the particles.

8. The particle manufacturing apparatus according to claim 6, wherein the granulation device includes a conveyance airflow applicator configured to apply a conveyance airflow to the liquid discharged by the discharge device.

9. The particle manufacturing apparatus according to claim 8, wherein the conveyance airflow is applied in the direction orthogonal to the axial direction of the liquid feed-discharger.

10. The discharge device of claim 1, wherein the ratio (X/Y) is more than 1 and less than or equal to 4.

11. The discharge device of claim 1, wherein the ratio (X/Y) is more than 1 and less than or equal to 3.

12. The discharge device of claim 1, wherein the ratio (X/Y) is more than 1 and less than or equal to 2.

* * * * *